United States Patent
Ohshima

(10) Patent No.: US 10,873,680 B2
(45) Date of Patent: Dec. 22, 2020

(54) COMMUNICATION APPARATUS, COMMUNICATION METHOD AND STORAGE MEDIUM STORING PROGRAM

(71) Applicant: CANON KABUSHIKI KAISHA, Tokyo (JP)

(72) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 16/182,446

(22) Filed: Nov. 6, 2018

(65) Prior Publication Data

US 2019/0149690 A1     May 16, 2019

(30) Foreign Application Priority Data

Nov. 15, 2017  (JP) ................ 2017-220067

(51) Int. Cl.
*H04N 1/00*   (2006.01)
*H04N 1/327*  (2006.01)

(52) U.S. Cl.
CPC ..... *H04N 1/32765* (2013.01); *H04N 1/00307* (2013.01); *H04N 2201/0084* (2013.01)

(58) Field of Classification Search
CPC ........... H04N 1/32765; H04N 1/00307; H04N 2201/0084; H04N 5/23201; H04N 5/232061; G06F 1/1698; G06F 3/04847; H04W 76/14; H04W 76/15; H04W 4/80
See application file for complete search history.

(56) References Cited

U.S. PATENT DOCUMENTS

| | | | | |
|---|---|---|---|---|
| 2014/0028817 | A1* | 1/2014 | Brockway, III | ............................... H04N 5/232411 348/61 |
| 2014/0168681 | A1* | 6/2014 | Nakamura | ............ G06F 3/1286 358/1.13 |
| 2014/0184824 | A1* | 7/2014 | Matsuda | ................ H04N 7/183 348/207.1 |
| 2014/0192792 | A1* | 7/2014 | Huang | .................. H04W 76/10 370/338 |
| 2016/0156721 | A1* | 6/2016 | Kumagai | ................ H04L 69/24 709/203 |
| 2016/0173645 | A1* | 6/2016 | Okuhara | ................. H04L 67/14 709/218 |
| 2016/0232393 | A1* | 8/2016 | Nakajima | ........... H04W 12/003 |
| 2016/0352568 | A1* | 12/2016 | Lindoff | ................. H04W 40/22 |
| 2017/0202035 | A1* | 7/2017 | Yokoyama | ............. H04W 8/26 |
| 2018/0359406 | A1* | 12/2018 | Nagahiro | ......... H04N 5/225251 |

FOREIGN PATENT DOCUMENTS

| JP | 2011-182449 A | 9/2011 |
|---|---|---|
| JP | 2014-158255 A | 8/2014 |

* cited by examiner

*Primary Examiner* — Kelly L Jerabek
(74) *Attorney, Agent, or Firm* — Canon U.S.A., Inc. I.P. Division

(57) ABSTRACT

A communication apparatus that communicates with an external apparatus includes a transmission unit that transmits, to the external apparatus via a first relay apparatus, connection information that the external apparatus uses to directly communicate with the communication apparatus and a control unit that controls direct communication with the external apparatus when disconnection of communication with the external apparatus via the first relay apparatus is detected.

12 Claims, 8 Drawing Sheets

FIG. 2A

| | 211a, 211 | 211b, 211 | 211c, 211 | | | 210 |
|---|---|---|---|---|---|---|
| CONNECTED DEVICE INFORMATION NUMBER | 1 | 2 | 3 | 4 | ... | N |
| CONNECTION ORDER | 6 | 2 | 5 | — | | — |
| DEVICE TYPE | MOBILE PHONE | MOBILE PHONE | PC | — | | — |
| REGISTERED NAME | mobilePhone1 | mobilePhone2 | PC1 | — | | — |
| UUID | 0000-ABCD-EFGH | 0000-1234-4567 | 0011-AAAA-BBBB | — | | — |
| BROWSING PERMISSION | PERMITTED | NOT PERMITTED | PERMITTED | — | | — |
| NETWORK FORMATION PARAMETER NUMBER | 1 | — | — | — | | — |

FIG. 2B

| | 221a, 221 | 221b, 221 | | | | 220 |
|---|---|---|---|---|---|---|
| NETWORK PARTICIPATION PARAMETER NUMBER | 1 | 2 | 3 | 4 | ... | M |
| CONNECTION ORDER | 6 | 2 | — | — | | — |
| ESSID | NETWORK-100 | NETWORK-101 | — | — | | — |
| AUTHENTICATION METHOD | WPA2 | WPA | — | — | | — |
| ENCRYPTION TYPE | AES | TKIP | — | — | | — |
| ENCRYPTION KEY | abcdefgh | 1234567 | — | — | | — |
| CHANNEL | 1 | 8 | — | — | | — |
| IP ADDRESS ACQUISITION METHOD | Auto | Auto | — | — | | — |
| DNS ACQUISITION METHOD | Auto | Auto | — | — | | — |

FIG. 2C

| | 231a, 231 | | | | | 230 |
|---|---|---|---|---|---|---|
| NETWORK FORMATION PARAMETER NUMBER | 1 | 2 | 3 | 4 | ... | N |
| ESSID | CAMERA-123 | | | | | |
| ENCRYPTION KEY | 12345678 | | | | | |

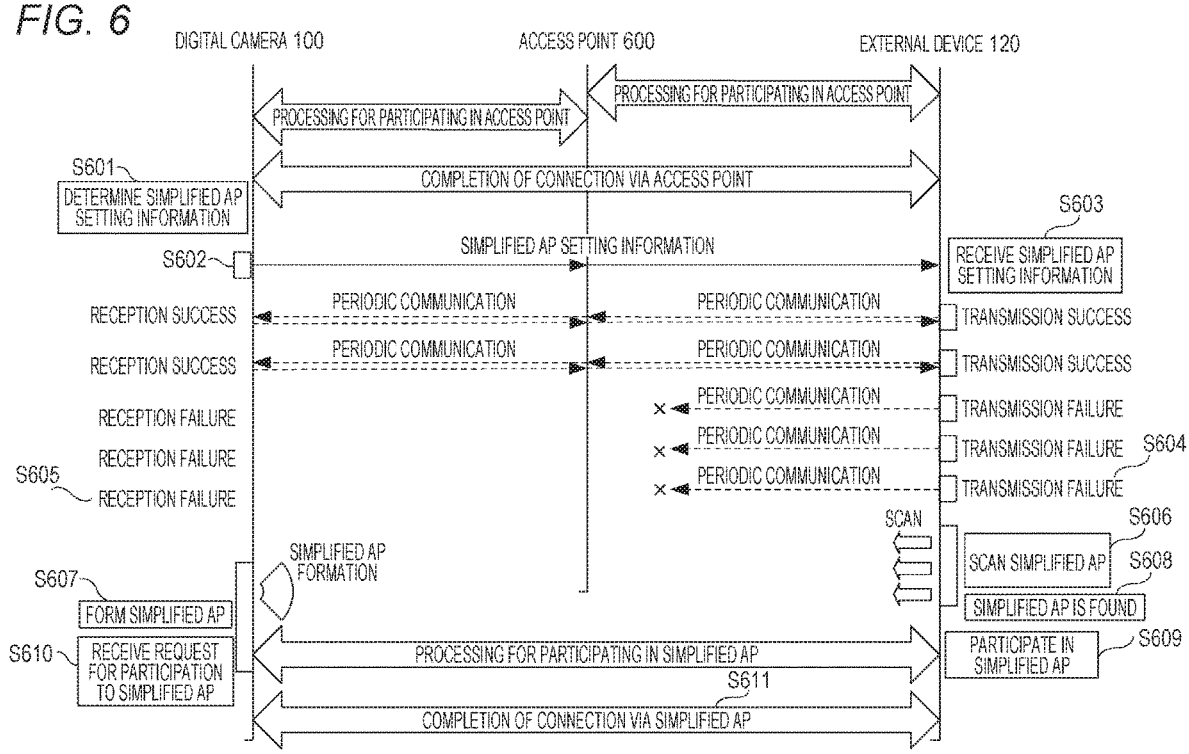

COMMUNICATION APPARATUS, COMMUNICATION METHOD AND STORAGE MEDIUM STORING PROGRAM

BACKGROUND

Field

The present disclosure relates to a communication apparatus, communication method, and storage medium storing a program.

Description of the Related Art

In recent years, image capturing apparatuses such as digital cameras equipped with wireless communication apparatuses are able to connect with communication apparatuses such as smart phones. Image data captured by an image capturing apparatus is selected by a communication apparatus to be transmitted from the image capturing apparatus to the communication apparatus, whereby image data can be stored in the communication apparatus. A live view image captured by an image capturing apparatus can also be displayed in real time by the communication apparatus.

In addition, some wireless communication apparatuses have simple access point functions. When the wireless communication apparatus activates the simple access point function, another apparatus detects the wireless communication apparatus as an access point and participates in the network formed by the wireless communication apparatus. By doing this, connection is established between wireless communication apparatuses even in an environment without an access point.

Communication apparatuses such as smart phones are often connected to home access points. An image capturing apparatus such as a digital camera equipped with a wireless communication apparatus is connected to the communication apparatus via the access point at home and connected directly to the communication apparatus by a simple access point function outside the home.

Japanese Patent Laid-Open No. 2014-158255 discloses a wireless communication apparatus with a first communication for communicating with an access point and a second communication for communicating with another communication apparatus via a network having an access point. The wireless communication apparatus in Japanese Patent Laid-Open No. 2014-158255 includes a detection unit and a reconnection unit. The detection unit detects the first communication state. When the detection unit detects disconnection of the first communication, the reconnection unit makes reconnection in the first communication, and then makes reconnection in the second communication by using the connection information of the network layer of the wireless communication apparatus, which has been acquired via the first communication.

Japanese Patent Publication Laid-open No. 2011-182449 also discloses the following first wireless communication apparatus and second wireless communication apparatus. In the case of handover, the first wireless communication apparatus transmits the participation information for participating in the network to the second wireless communication apparatus by NFC when the first wireless communication apparatus is connected to the terminal device via a wireless LAN and is involved in the network. In the case of handover, when receiving the participation information by the NFC, the second wireless communication apparatus connects to the network to participate therein by a wireless LAN based on the acquired participation information.

When the communication is disconnected while the first communication apparatus and the second communication apparatus are communicating via a relay apparatus, the communication cannot be continued if there is a problem in communication between the first communication apparatus and the relay apparatus or communication between the second communication apparatus and the relay apparatus. Regarding this point, Japanese Patent Laid-Open No. 2014-158255 does not describe a case where communication via a relay apparatus is impossible because communication via any one of relay apparatuses is a prerequisite. Also, Japanese Patent Laid-Open No. 2011-182449 is a technique related to a handover.

SUMMARY

A communication apparatus that communicates with an external apparatus includes a transmission unit configured to transmit, to the external apparatus via a first relay apparatus, connection information that the external apparatus uses to directly communicate with the communication apparatus and a control unit configured to control direct communication with the external apparatus when disconnection of communication with the external apparatus via the first relay apparatus is detected.

Further features will become apparent from the following description of exemplary embodiments with reference to the attached drawings.

BRIEF DESCRIPTION OF THE DRAWINGS

FIG. 1 is a diagram illustrating an example of a configuration of a digital camera or the like.

FIGS. 2A to 2C are diagrams illustrating an example of a database of the digital camera.

FIG. 6 is a diagram illustrating an example of a sequence of communication processing.

DESCRIPTION OF THE EMBODIMENTS

The communication system of the present embodiment includes a digital camera 100 and an external device 120 that can communicate with each other. The digital camera 100 is an example of an image capturing apparatus and is an example of a communication apparatus. The external device 120 is an example of an external apparatus and is an example of a communication apparatus.

Figure 1:
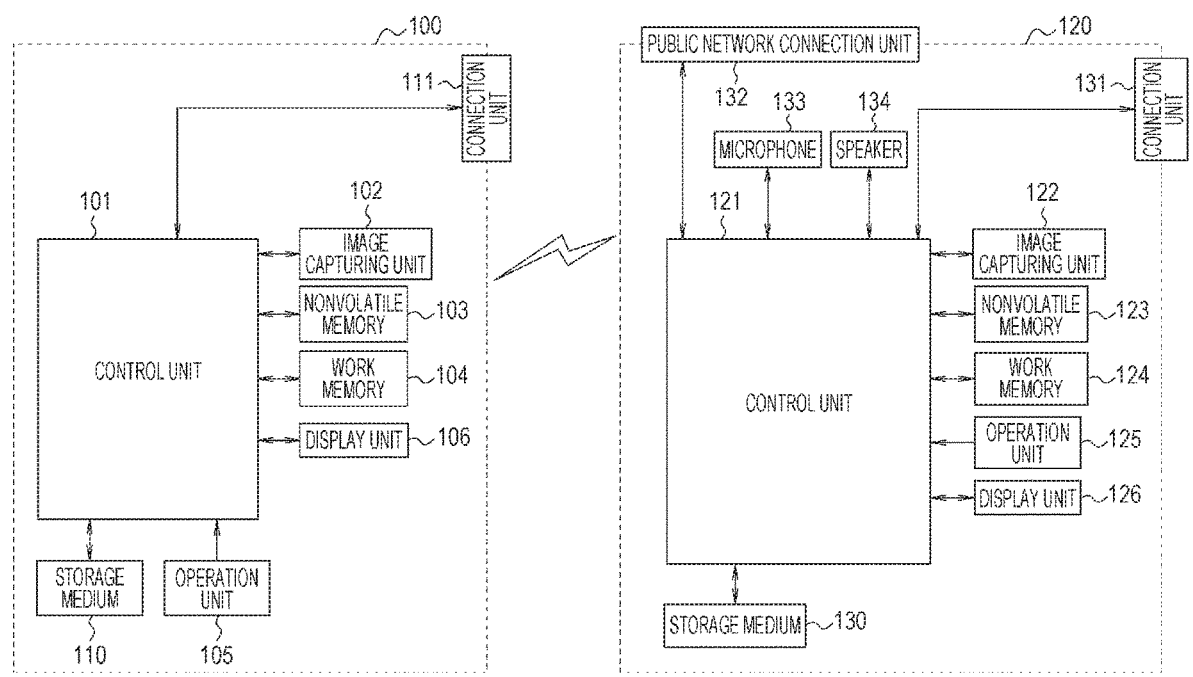

First, with reference to FIG. 1, the configuration of the digital camera 100 will be described. FIG. 1 is a diagram illustrating an example of the configuration of the digital camera 100 and the external device 120. The digital camera 100 includes a control unit 101, an image capturing unit 102, a nonvolatile memory 103, a work memory 104, an operation unit 105, a display unit 106, a storage medium 110, and a connection unit 111.

The control unit 101 controls the digital camera 100. The control unit 101 executes processing based on a program stored in the nonvolatile memory 103, so that various functions of the digital camera 100 and processing of the digital camera 100 as illustrated in FIGS. 3A, 3B, 3C, 4 and 6 is implemented. Instead of the digital camera 100 being controlled by the control unit 101, a plurality of hardware elements can share the processing to control the digital camera 100.

The image capturing unit 102 converts subject light focused by a lens included in the image capturing unit 102 into an electrical signal, and performs noise reduction processing thereon, and the like, thereby outputting digital data as image data. After being stored in a buffer memory, the captured image data is subjected to a predetermined operation of the control unit 101 and is stored in the storage medium 110.

The nonvolatile memory 103 is a nonvolatile memory in which data can be electrically erased and stored. The nonvolatile memory 103 stores a program and the like to be executed by the control unit 101.

The work memory 104 is used as a buffer memory for temporarily storing image data captured by the image capturing unit 102, an image display memory of the display unit 106, a work area of the control unit 101, and the like.

The operation unit 105 receives instructions to be provided to the digital camera 100 from the user. The operation unit 105 includes operation members such as a power button for the user's instruction to turn on/off the power of the digital camera 100, a release switch for instruction to capture an image, a reproduction button for instruction to reproduce image data. A touch panel formed on the display unit 106, which will be described below, is also included in the operation unit 105. The release switch includes a SW1 and a SW2. When the release switch is in a half-depression state, the SW1 is turned on. As a result, the control unit 101 accepts an instruction to perform image capturing preparation such as auto focus (AF) processing, automatic exposure (AE) processing, auto white balance (AWB) processing, flash preliminary light emission (EF) processing. When the release switch is in a full-depression state, the SW2 is turned on. As a result, the control unit 101 accepts an instruction to capture an image.

The display unit 106 displays a viewfinder image at the time of image capturing, displays captured image data, and displays characters for an interactive operation screen, and the like. The display unit 106 does not necessarily need to be integrated with the digital camera 100. The digital camera 100 need only be able to connect to the internal or external display unit 106 and to have at least a display control function for controlling the display of the display unit 106.

The storage medium 110 stores the image data output from the image capturing unit 102. The storage medium 110 can be configured to be detachably attached to the digital camera 100, or can be integrated with the digital camera 100. The digital camera 100 need only be able to access the storage medium 110.

The connection unit 111 is an interface for connecting to an external apparatus. The digital camera 100 of the present embodiment can exchange data with an external apparatus via the connection unit 111. In the present embodiment, the connection unit 111 includes a communication interface for communicating with an external apparatus via a wireless LAN. The control unit 101 implements wireless communication with an external apparatus by controlling the connection unit 111. The communication method is not limited to the wireless LAN.

The digital camera 100 can operate as a slave device in the wireless LAN infrastructure mode. By being connected to a peripheral access point (hereinafter also referred to as an AP), the digital camera 100 can participate in the network formed by the AP when operating as a slave device. The digital camera 100 can also operate as an AP that is simplified (hereinafter also referred to as a simplified AP) with more limited functions, which is one type of the AP. The AP in the present embodiment is an example of a relay apparatus. When operating as a simplified AP, the digital camera 100 forms a network by itself. A device in the vicinity of the digital camera 100 can recognize the digital camera 100 as an AP and participate in the network formed by the digital camera 100. A program for operating the digital camera 100 as described above is stored in the nonvolatile memory 103.

The digital camera 100 is a type of AP, but is a simplified AP that does not have a gateway function of transferring data received from a slave device to an Internet provider or the like. Therefore, when data is received from another device involved in the network formed by the camera itself, the data cannot be transferred to a network such as the Internet. The digital camera 100 can have a gateway function.

A communication apparatus other than the digital camera 100 can be used. For example, an information processing device such as a mobile phone, portable media player, tablet device, or personal computer can be used as the communication apparatus.

Next, the configuration of the external device 120 will be described with reference to FIG. 1. The external device 120 includes a control unit 121, an image capturing unit 122, a nonvolatile memory 123, a work memory 124, an operation unit 125, a display unit 126, a storage medium 130, a connection unit 131, a public network connection unit 132, a microphone 133, and a speaker 134.

Figure 5:
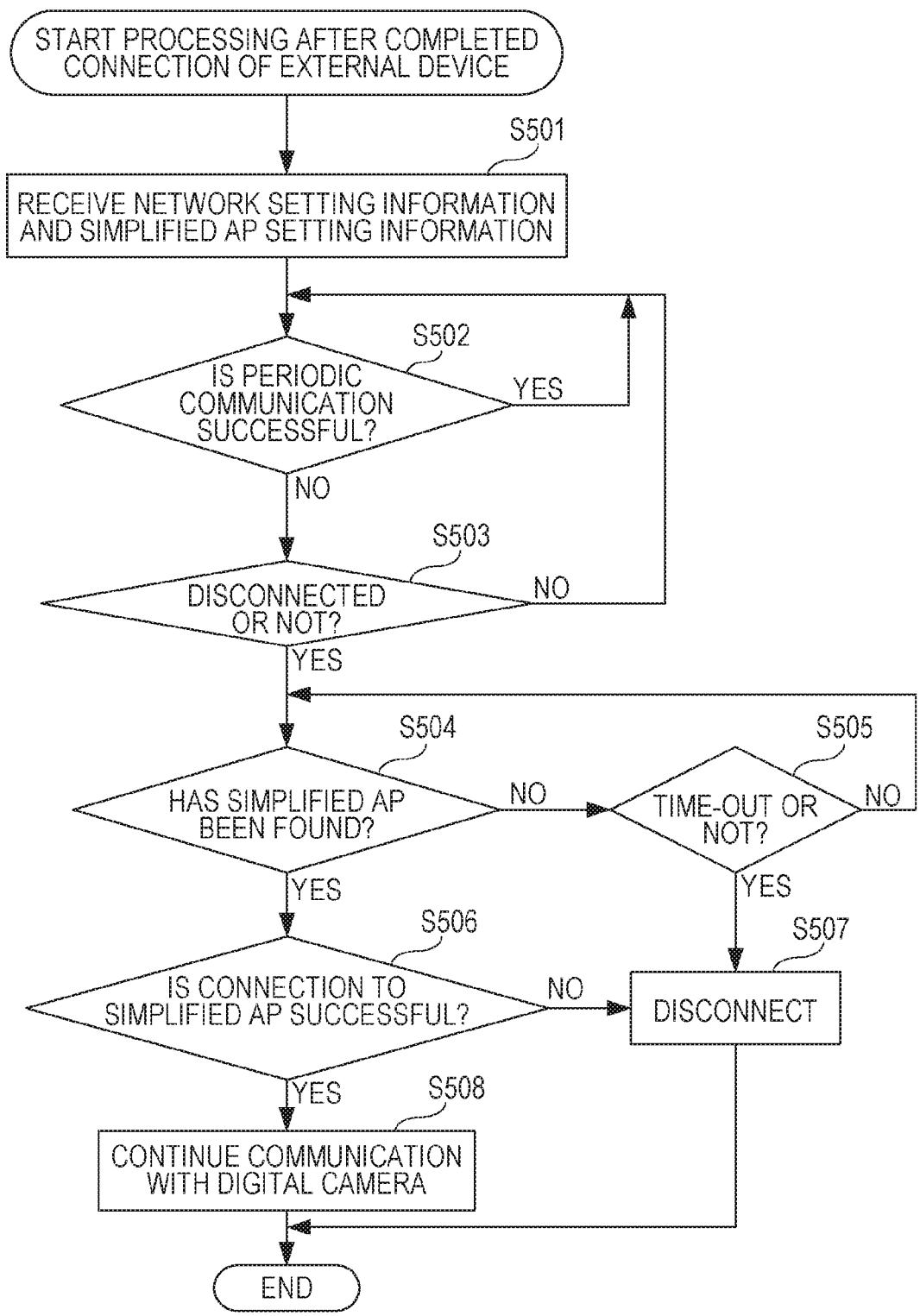
FIG. 5 is a flowchart illustrating an example of processing of an external apparatus.

The control unit 121 controls the external device 120. By the control unit 121 executing the processing based on the program stored in the nonvolatile memory 123, various functions of the external device 120 and the processing of the external device 120 illustrated in FIGS. 5 and 6 are achieved. Instead of controlling the external device 120 by the control unit 121, a plurality of hardware elements can share the processing to control the external device 120.

The image capturing unit 122 converts the subject light focused by the lens included in the image capturing unit 122 into an electric signal and outputs digital data as image data after performing noise reduction processing and the like. After the captured image data is stored in a buffer memory, the control unit 121 performs a predetermined operation and the data is stored in the storage medium 130.

The nonvolatile memory 123 is a nonvolatile memory that can electrically erase and store, and stores various programs and the like to be executed by the control unit 121. A program for the external device 120 to communicate with the digital camera 100 is also stored in the nonvolatile memory 123 and installed as a camera communication application. The processing of the external device 120 is attained by reading a program provided by the camera communication application. The camera communication application includes a program for using the basic functions of the operating system (OS) installed in the external device 120. The OS of the external device 120 can include a program for implementing the processing in the present embodiment.

The work memory 124 is used as a buffer memory for temporarily storing the image data generated by the image capturing unit 122, an image display memory of the display unit 126, a work area of the control unit 121, and the like.

The operation unit 125 receives an instruction to be provided to the external device 120 from the user. The operation unit 125 includes operation members such as a power button for user's instruction to turn on/off the power of the external device 120 and a touch panel formed on the display unit 126.

The display unit 126 performs display of image data, character display for interactive operation, and the like. The display unit 126 is not necessarily required to be integrated with the external device 120. The external device 120 need only be able to connect to the display unit 126 and to have at least a display control function for controlling the display of the display unit 126.

The storage medium 130 stores the image data output from the image capturing unit 122. The storage medium 130 can be configured to be detachably attached to the external device 120 or can be integrated with the external device 120. The external device 120 need only be able to access the storage medium 130.

The connection unit 131 is an interface for connecting to another external apparatus. The external device 120 can exchange data with another external apparatus via the connection unit 131. The connection unit 131 includes a communication interface for communicating with another external apparatus via a wireless LAN. The control unit 121 implements wireless communication with another external apparatus by controlling the connection unit 131.

The public network connection unit 132 is an interface used when public wireless communication is performed. The external device 120 can perform data communication via the public network connection unit 132. At the time of public wireless communication, i.e., phone call, the control unit 121 inputs and outputs audio signals via the microphone 133 and the speaker 134. The public network connection unit 132 includes an interface for performing communication using the 3G. Without limitation to the 3G, other communication schemes like 4G such as LTE, WiMAX®, ADSL or FTTH can be used. In addition, the connection unit 131 and the public network connection unit 132 are not necessarily configured by independent hardware, and for example, one antenna can serve for both these units.

A mobile terminal can be used as the external device 120, but the external device 120 is not limited to a mobile terminal. For example, an information processing device such as a digital camera with a wireless function, a portable media player, a tablet device, a personal computer, or a smart phone can be used as the external device 120.

While the configuration of the digital camera 100 and the external device 120 has been described above, the configuration is not necessarily limited. For example, device control, data storage, etc. do not always need to be performed by one hardware element, and a plurality of hardware elements can share the processing and function as one unit. Conversely, one hardware element can perform various types of processing to function as a plurality of units.

Next, with reference to FIGS. 2A to 2C, a database stored in the digital camera. 100 will be described. FIGS. 2A to 2C are diagrams illustrating an example of a database of a digital camera.

When making communication connection with a partner device as a communication partner, first, the digital camera 100 participates in the network (here, including the case where the camera itself forms a network as a simplified AP), and thereafter establishes a communication connection with the partner device. In the present embodiment, the digital camera 100 manages the information on the network and the information on the partner device with which communication connection is made in different tables. The database stored in the digital camera 100 includes a connected device information table 210, network participation parameter table 220, and network formation parameter table 230.

First, with reference to FIG. 2A, the connected device information table 210 will be described. FIG. 2A is a diagram illustrating an example of the connected device information table 210. The connected device information table 210 can include a plurality of connected device information sets 211.

The connected device information set 211 is information on a connected device with which the digital camera 100 communicably connects. The connected device information set 211 includes "connected device information number", "connection order", "device type", "registered name", "universally unique identifier (UUID)", "browsing permission setting", and "network formation parameter number". The "connected device information number" is identification information given to each connected device information set 211. The "connection order" is the number of sequential order in which the digital camera 100 has been connected to the connected device corresponding to the connected device information set 211 in the past. The higher the value of "connection order", the more recently the device has been connected. The "registered name" is the name of a connected device that can be set by the user, and can be freely changed so that the user can identify the connected device. The "device type" and "UUID" of the connected device information set 211 are the type and UUID of the connected device corresponding to the connected device information set 211, respectively. The "device type", "registered name", "UUID", and the like are not necessarily separate pieces of information, and the information can be specified by using one ID obtained by concatenating a type, name, and unique character string, for example. The "network formation parameter number" of the connected device information set 211 is used when the connected device corresponding to the connected device information set 211 is communicably connected with the digital camera 100 via the network formed by the digital camera 100. The "network formation parameter number" of the connected device information set 211 indicates which network formation parameter 231 the digital camera 100 has used to form a network when the connected device corresponding to the connected device information set 211 is communicably connected to the digital camera 100.

The connected device information table 210 can store N connected device information sets 211 from a first connected device information set 211a to an Nth connected device information set 211. In the example of FIG. 2A, the first connected device information set 211a to a third connected device information set 211c are stored in the connected device information table 210. When an (N+1)th connected device information set 211 is stored in the connected device information table 210, any one of connected device information sets 211 already stored in the connected device information table 210 needs to be deleted.

The digital camera 100 can delete the connected device information set 211 based on the user's operation. When attempting to newly store the connected device information set 211 in a state in which N connected device information sets 211 are stored, the digital camera 100 refers to the "connection order" and can delete the connected device information set 211 having the smallest number.

Next, the network participation parameter table 220 will be described with reference to FIG. 2B. FIG. 2B is a diagram illustrating an example of the network participation parameter table 220. The network participation parameter table 220 can include a plurality of network participation parameters 221. The network participation parameter 221 is information for managing a network formed by an external AP or the like, which the digital camera 100 has participated in. The network participation parameter 221 is information including a network parameter of a network formed by the external AP or the like.

The network participation parameter 221 includes "network participation parameter number", "connection order", "extended service set identifier (ESSID)", "authentication method", "encryption type", "encryption key", and "channel". The network participation parameter 221 also includes "IP address acquisition method" and "DNS acquisition method". The "network participation parameter number" is identification information given to each individual network participation parameter 221. The "connection order" is the number of sequential order of participation in the past in the wireless network corresponding to the network participation parameter 221 stored in the digital camera 100, and the greater the number the more recent participation. The "ESSID", "authentication method", "encryption type", "encryption key", "channel", "IP address acquisition method", and "DNS acquisition method" of the network participation parameter 221 are information on networks in which the digital camera 100 has participated in the past.

The network participation parameter table 220 can store M network participation parameters 221 from a first network participation parameter 221a to an Mth network participation parameter. In the example of FIG. 2B, the first network participation parameter 221a and a second network participation parameter 221b are stored in the network participation parameter table 220. When an (M+1)th network participation parameter 221 is stored in the network participation parameter table 220, any one of network participation parameters 221 already stored in the network participation parameter table 220 needs to be deleted.

The digital camera 100 can delete the network participation parameter 221 based on the user's operation. The digital camera 100 can delete the network participation parameter 221 with the smallest number of "connection order" when attempting to newly register the network participation parameter 221 in a state where M network participation parameters 221 are stored. When the camera forms a network using itself as a simplified AP, the information is managed by the network formation parameter 231 described next, as information that can be distinguished from the network participation parameter 221.

Next, the network formation parameter table 230 will be described with reference to FIG. 2C. FIG. 2C is a diagram illustrating an example of the network formation parameter table 230.

The network formation parameter 231 is for managing information on a network formed by the digital camera 100 as a simplified AP. The network formation parameter 231 includes network parameters of a network formed by the digital camera 100 as a simplified AP.

The network formation parameter 231 includes "network formation parameter number", "ESSID", and "encryption key". The "network formation parameter number" is identification information given to each network formation parameter 231. The "ESSID" and "encryption key" of the network formation parameter 231 are information on a network formed by the digital camera 100 as a simplified AP.

The network formation parameter 231 can include the authentication method, encryption type, channel, IP address acquisition method, DNS acquisition method, and the like, but the items common to all the networks generated by the digital camera 100 are not necessarily included.

Like the connected device information table 210, the network formation parameter table 230 can store N network formation parameters 231 from a first network formation parameter 231a to an Nth network formation parameter 231. In the example of FIG. 2C, the first network formation parameter 231a is stored in the network formation parameter table 230. When deleting the connected device information set 211, the digital camera 100 deletes the network formation parameter 231 associated with the connected device information set 211. Thereby, the network formation parameter table 230 does not store more than N network formation parameters 231.

The database stored in the digital camera 100 is stored in the nonvolatile memory 103. The control unit 101 can use the information of the database by acquiring the information from the nonvolatile memory 103 or by extracting the information in the work memory 104. When the information of the database extracted in the work memory 104 is updated, the database of the nonvolatile memory 103 is also updated in the same manner.

Figure 3A:
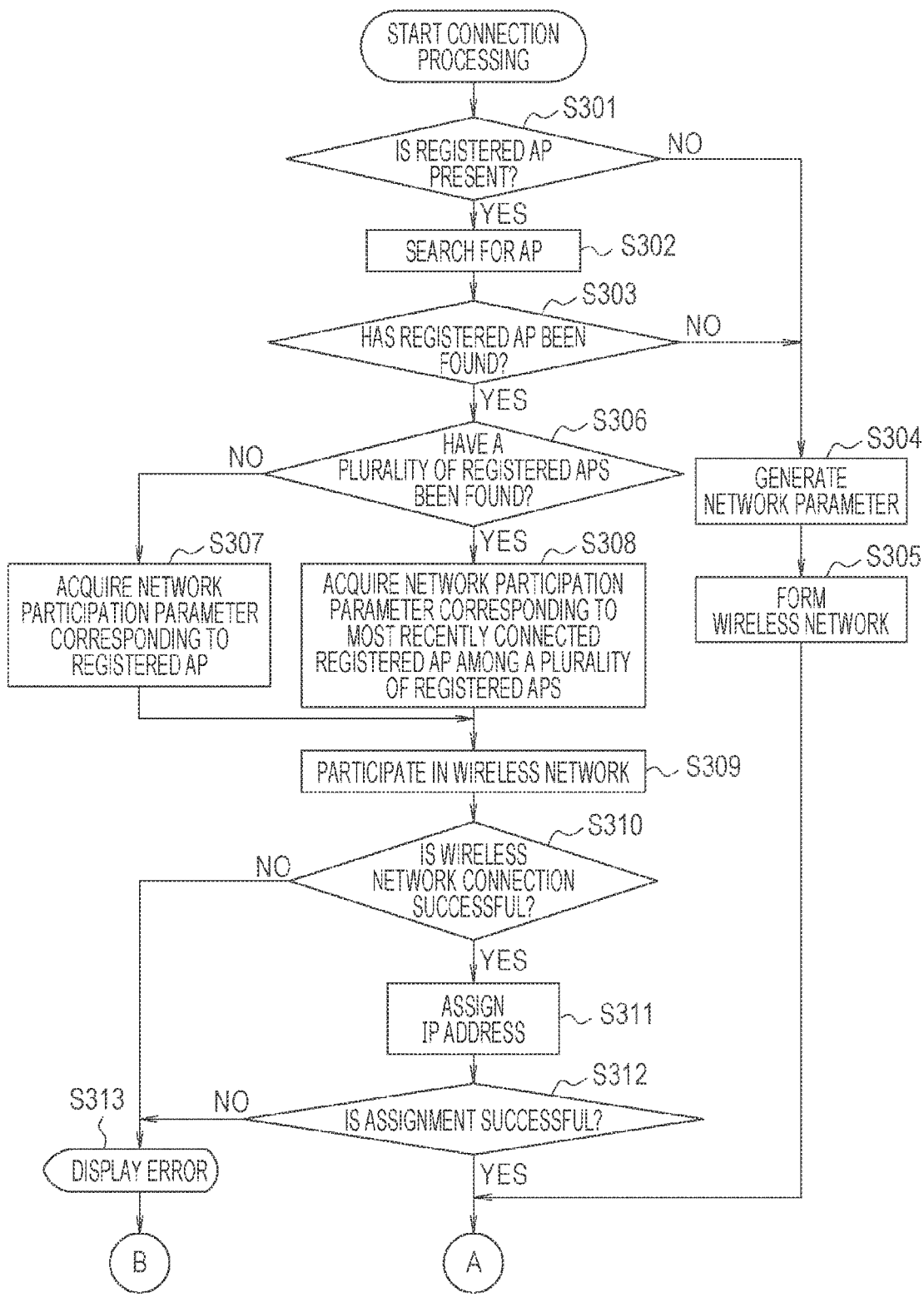
FIG. 3A is a flowchart illustrating an example of processing of the digital camera.
Figure 3B:
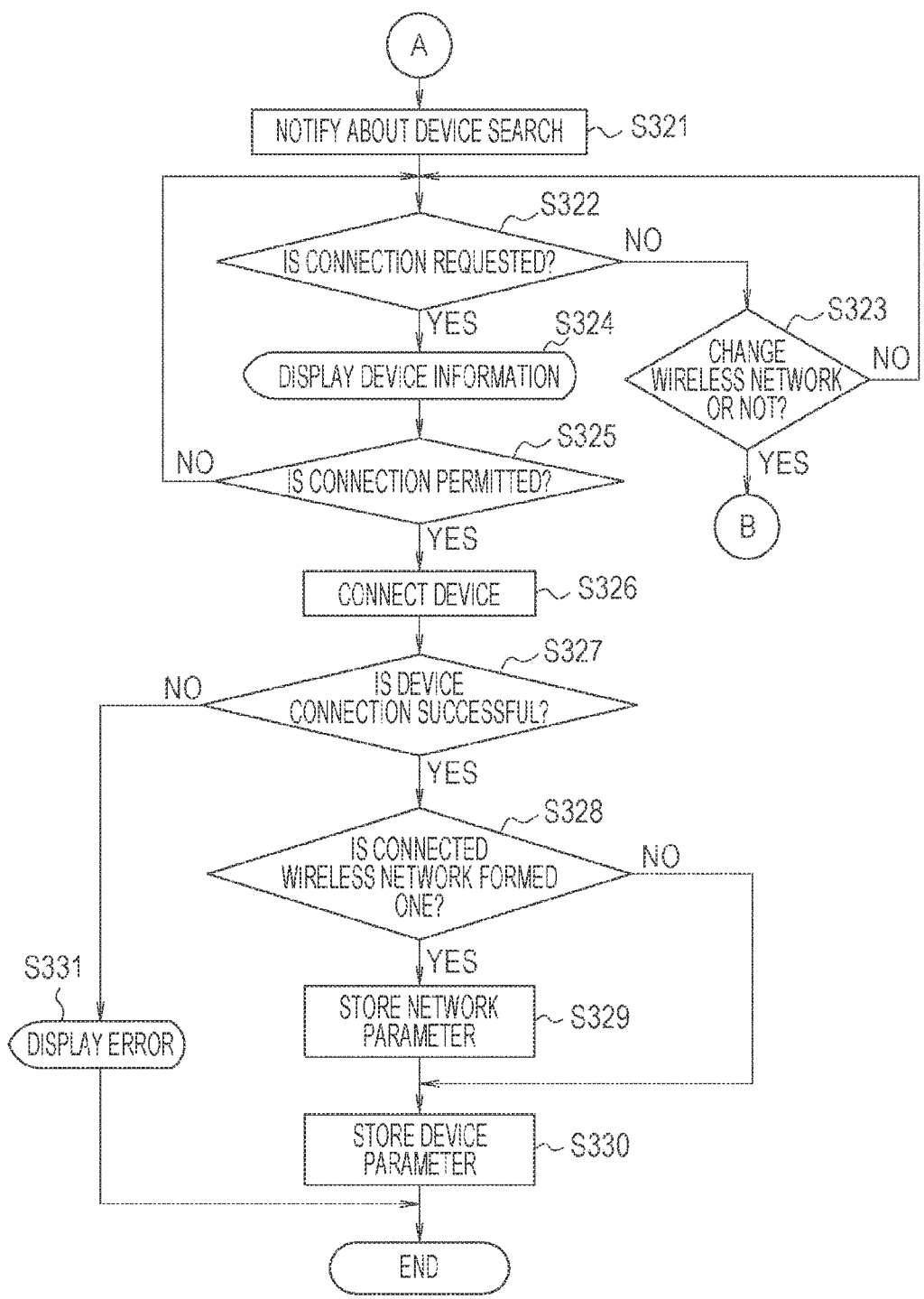
FIG. 3B is a flowchart illustrating an example of processing of the digital camera.
Figure 3C:
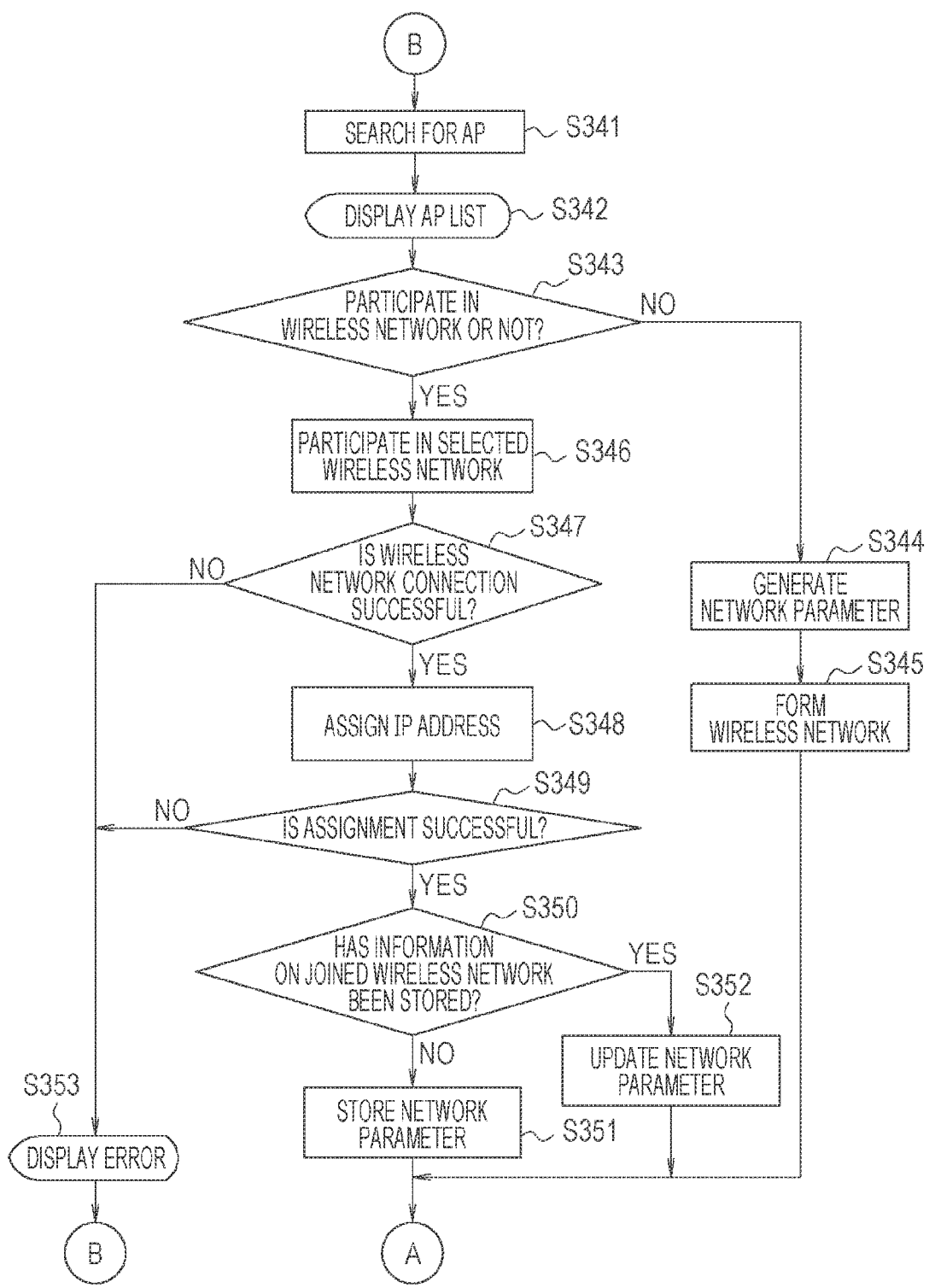
FIG. 3C is a flowchart illustrating an example of processing of the digital camera.

Next, the connection processing will be described with reference to FIGS. 3A, 3B, and 3C. FIGS. 3A, 3B, and 3C are flowcharts illustrating an example of connection processing. The connection processing is processing in the digital camera 100 executed when the digital camera 100 establishes the communication with the external device 120 for the first time. The connection processing is started when the digital camera 100 accepts an instruction to connect with another device from a user using a menu operation or the like.

First, the connection processing will be described with reference to FIG. 3A.

In S301, the control unit 101 determines whether a network participation parameter 221 is stored in the network participation parameter table 220. When determining that a network participation parameter 221 is stored, the control unit 101 advances the processing to S302. When determining that a network participation parameter 221 is not stored, the control unit 101 advances the processing to S304. The network participation parameter 221 corresponds to the AP that has formed the wireless network corresponding to the network participation parameter 221. The AP that has formed the wireless network corresponding to the network participation parameter 221 is called a registered AP. The processing of S301 is processing of the control unit 101 determining whether the registered AP is present.

In S302, the control unit 101 searches nearby APs by controlling the connection unit 111.

In S303, the control unit 101 determines whether a registered AP is found by the AP search in S302. When determining that a registered AP has been found by the AP search in S302, the control unit 101 advances the processing to S306. When determining that a registered AP has not been found in the AP search in S302, the control unit 101 advances the processing to S304. When the ESSID included in the data received from an AP in the AP search at S302 is equal to the "ESSID" of any one of the network participation parameters 221, the control unit 101 determines the AP that is the transmission source of this data as a registered AP. Other identifiers such as "basic service set identifier (BSSID)" can be stored in the network participation parameter 221 and the determination can be made by using this identifier.

In S304, the control unit 101 generates network parameter for forming a wireless LAN network. The network parameter includes an ESSID, an authentication method, an encryption type, an encryption key, and a channel. In S304, the control unit 101 generates a network parameter in which one or more of the ESSID, the authentication method, the encryption type, the encryption key, or the channel changes every time. In the present embodiment, the control unit 101 generates the parameter in which the ESSID and encryption key change each time. At the timing of processing in S304, the control unit 101 does not register the network formation parameter 231 made up of the generated network parameters in the network formation parameter table 230. The control unit 101 performs the registration in the network formation parameter table 230 at the point of time when a connection with a connected device to be described below is established.

In the previously described S301, when determining that a network participation parameter 221 is not stored, the control unit 101 advances the processing to S304 for the following reason. That is because even if the AP search is performed in S302, the registered AP cannot be found in S303 when a network participation parameter 221 is not stored. Therefore, when the control unit 101 determines that a network participation parameter 221 is not stored, the search processing of S302 is unfitted, and the time until connection establishment is shortened.

In S305, the control unit 101 forms a wireless LAN network by using the network parameters generated in S304. In addition, the control unit 101 performs control to display at least the ESSID and the encryption key on the display unit 106 as information necessary for the external apparatus to participate in the network. In S305, the control unit 101 assigns an IP address and sets a subnet to enable communication with other devices, and advances the processing to S321.

In S306, the control unit 101 determines whether a plurality of registered APs have been found in AP search in S302. When determining that a plurality of registered APs are found, the control unit 101 advances the processing to S308. When determining that a plurality of registered APs have not been found, the control unit 101 advances the process to S307.

In S307, the control unit 101 acquires the network participation parameter 221 corresponding to the registered AP discovered in the AP search of S302, from the network participation parameter table 220.

In S308, the control unit 101 acquires the network participation parameter 221 corresponding to the registered AP to which the digital camera 100 communicably connected most recently from among the plurality of registered APs found in the AP search in S302. More specifically, the control unit 101 acquires the network participation parameter 221 with the largest "connection order" value from among the network participation parameters 221 corresponding to the registered APs. Due to this, the control unit 101 can select a registered AP that has been communicably connected most recently. For example, it is assumed that three APs, that is, NETWORK-100, NETWORK-101, and NETWORK-102 are searched in the AP search in S302 in the state where the network participation parameter table 220 is as illustrated in FIG. 2B. In this case, from among the searched APs, what are stored in the network participation parameter table 220 are NETWORK-100 of the first network participation parameter 221a and NETWORK-101 of the second network participation parameter 221b. In addition, the "connection order" of the first network participation parameter 221a is "6", and the "connection order" of the second network participation parameter 221b is "2". Therefore, the control unit 101 acquires the first network participation parameter 221a having a larger "connection order" as the network participation parameter 221 corresponding to the registered AP to which the connection has been made most recently.

In S309, the control unit 101 participates in the wireless LAN network formed by the AP corresponding to the network participation parameter 221 acquired in S307 or S308, based on the network participation parameter 221 acquired in S307 or S308.

In S310, the control unit 101 determines whether the connection to the wireless LAN network has succeeded. When determining that the connection is successful, the control unit 101 advances the processing to S311. When determining that the connection has failed, the control unit 101 advances the processing to S313 and displays an error.

In S311, the control unit 101 performs assignment of an IP address and setting of a subnet based on an IP address acquisition method and a DNS acquisition method of the network participation parameter 221 acquired in S307 or S308.

In S312, the control unit 101 determines whether the assignment of the IP address is successful. When determining that the assignment of the IP address is successful, the control unit 101 advances the processing to S321. When determining that the assignment of the IP address has failed, the control unit 101 advances the processing to S313 and displays an error.

In S313, the control unit 101 performs control to display on the display unit 106, information that the connection to the wireless LAN network has failed or that the assignment of the IP address has failed. When receiving a notification from the user via the operation unit 125 that the error content has been confirmed, the control unit 101 advances the processing to S341.

Next, the connection processing will be described with reference to FIG. 3B.

In S321, the control unit 101 makes notification using a Simple Service Discovery Protocol (SSDP), a multicast Domain Name Service (mDNS), or the like. A communication apparatus such as the external device 120 detects a service by receiving a notification. The control unit 101 advances the processing to S322 after performing the notification processing. In the present embodiment, the external device 120 searches for the digital camera 100 by activating a predetermined communication application.

In S322, the control unit 101 determines whether a connection request has been received from the communication apparatus via the connection unit 111. When determining that a connection request has been received from the communication apparatus, the control unit 101 advances the processing to step S324 to display the device information. When determining that a connection request has not been received from the communication apparatus, the control unit 101 advances the processing to S323.

In S323, the control unit 101 determines whether an instruction to change the wireless network has been received from the user via the operation unit 125. When determining that the instruction to change the wireless network has been received, the control unit 101 erases the wireless LAN network currently formed, or disconnects itself from the network in which the control unit 101 is currently involved, and advances the processing to S341. When determining that the instruction to change the wireless network has not been received, the control unit 101 advances the processing to S322.

In S324, the control unit 101 performs control to display on the display unit 106, device information such as a device name included in the connection request from the communication apparatus. When the connected device information table 210 includes the connected device information set 211 including the same UUID as the UUID included in the connection request from the communication apparatus, the control unit 101 can perform the following control. That is, the control unit 101 can perform control to display on the display unit 106 "registered name" of the connected device information set 211 including the same UUID as the UUID included in the connection request from the communication apparatus.

In S325, the control unit 101 accepts from the user via the operation unit 125 information whether permission is made to connect with the communication apparatus corresponding to the device information displayed in S324. When having accepted permission to connect with the communication apparatus corresponding to the device information displayed in S324, the control unit 101 saves the UUID and the device name included in the connection request in the work memory 104 in association with each other, and advances the processing to S326. When having accepted the intention of not permitting connection with the communication apparatus corresponding to the device information displayed in S324, the control unit 101 advances the processing to S322 and waits for a connection request from the communication apparatus again.

In S326, the control unit 101 controls the connection unit 111 and performs processing for connection with the communication apparatus that is the transmission source of the most recent connection request in S322.

In S327, the control unit 101 determines whether establishment of a connection with the communication apparatus, which is the transmission source of the most recent connection request in S322 has succeeded. When determining that the connection has been established, the control unit 101 advances the processing to S328. When determining that the connection has not been established, the control unit 101 advances the processing to S331. A communication apparatus whose connection is established in S327 is also called a connected device.

In S328, the control unit 101 determines whether the currently connected wireless LAN network is a network formed by the digital camera 100 using its own simplified AP function. When determining that the network is a network formed by the digital camera 100 itself, the control unit 101 advances the processing to S329. When determining that the network is not a network formed by the digital camera 100 itself, the control unit 101 advances the processing to S330.

In S329, the control unit 101 generates a network formation parameter 231 composed of network parameters (network parameters generated in S304) of the network formed by the digital camera 100 itself. Then, the control unit 101 registers and stores the generated network formation parameter 231 in the network formation parameter table 230. For example, it is assumed that no network formation parameter 231 is registered in the network formation parameter table 230. Then, it is assumed that "ESSID" of the network parameter of the network formed by the digital camera 100 itself is "CAMERA-123" and "encryption key" is "12345678". In this case, the control unit 101 generates the first network formation parameter 231a illustrated in FIG. 2C and registers the parameter in the network formation parameter table 230, so that the network formation parameter table 230 is in a state as illustrated in FIG. 2C.

The network formation parameter 231 is a parameter that becomes available for the second or later connection to be described below by storing the parameter in association with the connected device on a one-to-one basis. Therefore, the parameters are stored not immediately after forming the network but after the connected devices to be associated are determined. In addition, the reason why the network parameter is not stored when it is determined that the network is not a network formed by the digital camera 100 itself is that the parameter is stored in S351 or S352 to be described below.

In S330, the control unit 101 generates the connected device information set 211 based on the information of the connected device received from the connected device. At this time, the control unit 101 sets the "connected device information number" of the connected device information set 211 to a value different from the "connected device information number" of the connected device information set 211 already stored in the connected device information table 210. The control unit 101 sets the "connection order" of the connected device information set 211 to a value larger than the "connection order" of the connected device information set 211 previously stored in the connected device information table 210. The control unit 101 can use the UUID stored in the work memory in S325 as the "UUID" of the connected device information set 211, or can inquire the UUID from the connected device to acquire the UUID. The control unit 101 can determine "browsing permission" of the connected device information set 211 based on an instruction accepted from the user, or can enable the user to change the decision after determining whether to permit by default. When determining that the network is a network formed by the digital camera 100 itself in S328, the control unit 101 sets the "network formation parameter number" of the connected device information set 211 to the following value. That is, the control unit 101 sets the "network formation parameter number" of the connected device information set 211 to the "network formation parameter number" of the network formation parameter 231 stored in S329. When determining that the network is not a network formed by the digital camera 100 itself in S328, the control unit 101 does not set a value to the "network formation parameter number" of the connected device information set 211.

Then, the control unit 101 registers and stores the generated connected device information set 211 in the connected device information table 210. Thereafter, the control unit 101 ends the processing of FIGS. 3A to 3C.

For example, it is assumed that a second connected device information set 211b and the third connected device information set 211c have previously been registered in the connected device information table 210. Then, when the "registered name" of the device for which connection is established is "mobilePhone1", the control unit 101 generates a first connected device information set 211a as the connected device information set 211 and registers and stores the information in the connected device information table 210. By doing this, the connected device information table 210 is in the state illustrated in FIG. 2A. In S331, the control unit 101 performs control to display on the display unit 106, information that the connection with the external device 120 has failed. When receiving a notification that the error content has been confirmed, from the user via the operation unit 125, the control unit 101 ends the processing of FIGS. 3A to 3C.

Next, the connection processing will be described with reference to FIG. 3C.

In S341, the control unit 101 controls the connection unit 111 to search nearby APs by scanning.

In S342, the control unit 101 performs control to display on the display unit 106 a list of AP information included in the beacon signal detected as a result of scanning in S341. For example, the ESSID is used as the information of the AP. When listing the information of the AP's, the control unit 101 can arrange the information on the APs in which the control unit 101 has participated in the past in order of the participation in the APs by referring to "connection order" of the network participation parameter 221 to display the list. When listing the information of the APs, the control unit 101 can arrange the AP information in order of decreasing radio wave intensity of the APs to display the list.

In S343, the control unit 101 determines whether to participate in the wireless LAN network based on a user's instruction via the operation unit 105. When determining to participate in the wireless LAN network, the control unit 101 advances the processing to S346. When determining not to participate in the wireless LAN network, the control unit 101 advances the processing to S344.

The processing of S344 and S345 is the same processing as S304 and S305. After finishing the processing of S345, the control unit 101 advances the processing to S321.

In S346, the control unit 101 participates in the wireless LAN network formed by the AP selected by the user in S343.

When the AP selected by the user is an AP stored in the network participation parameter table 220, the control unit 101 can participate in the wireless LAN network without requesting the user to input an encryption key or the like. At this time, the control unit 101 can participate in the wireless LAN network by using the information of the network participation parameter 221 corresponding to the AP selected by the user. The control unit 101 can participate in the wireless LAN network by using the encryption key stored as the initial value in the input screen of the encryption key. The control unit 101 can use a previously stored method without requesting the user to select a method for the IP address acquisition method or the DNS acquisition method, or can request the user's selection.

When the AP selected by the user is an AP that is not stored in the network participation parameter table 220, the control unit 101 can request the user to input information for participating in the wireless LAN network. At this time, the control unit 101 can set the IP address acquisition method or the DNS acquisition method to Auto by default.

The processing from S347 to S349 is the same as the processing from S310 to S312. The control unit 101 advances the processing to S348 when determining that the connection to the wireless LAN network is successful in S347 and advances the processing to S353 when determining that the connection to the wireless LAN network has failed. In S349, the control unit 101 advances the processing to S350 when determining that the assignment of the IP address is successful, and advances the processing to S353 when determining that the IP address assignment has failed.

In S350, the control unit 101 refers to the network participation parameter table 220 and determines whether the information of the wireless LAN network in which the control unit 101 currently participates has been stored. When determining that the storage has been completed, the control unit 101 advances the processing to S352. When determining that the storage has not been completed, the control unit 101 advances the processing to S351.

In S351, the control unit 101 generates the network participation parameter 221 based on the parameters of the wireless LAN network in which the control unit 101 currently participates. Then, the control unit 101 registers and stores the generated network participation parameter 221 in the network participation parameter table 220. After that, the control unit 101 advances the processing to S321.

For example, it is assumed that the network participation parameter table 220 is in the state of FIG. 2B, and NETWORK-102 is selected from the list of the APs displayed in S342. In this case, the control unit 101 generates a third network participation parameter 221 in which the "network participation parameter number" is "3" and the "ESSID" is "NETWORK-102". The control unit 101 sets appropriate values to "authentication method", "encryption type", "encryption key", "channel", "IP address acquisition method", and "DNS acquisition method" of the third network participation parameter 221. Since the "connection order" of the third network participation parameter 221 needs to be the largest value, the control unit 101 sets the value to "7". Then, the generated third network participation parameter 221 is registered and stored in the network participation parameter table 220.

In S352, the control unit 101 generates the network participation parameter 221 based on the parameters of the wireless LAN network in which the control unit currently participates. Then, the control unit 101 updates the network participation parameter table 220 by using the generated network participation parameter 221. After that, the control unit 101 advances the processing to S321.

For example, it is assumed that the network participation parameter table 220 is in the state of FIG. 2B and NETWORK-101 is selected from the list of the APs displayed in S342. In this case, the control unit 101 generates the second network participation parameter 221b in which the "network participation parameter number" is "2" and the "ESSID" is "NETWORK-101". Since the "connection order" of the second network participation parameter 221b needs to be the largest value, the control unit 101 sets the value to "7". Then, by using the generated second network participation parameter 221b, the network participation parameter table 220 is updated.

In S353, the control unit 101 performs control to display on the display unit 106, information that the connection to the wireless LAN network has failed or that the assignment of the IP address has failed. When having received a notification that the error content has been confirmed from the user via the operation unit 125, the control unit 101 advances the processing to S341.

The digital camera 100 makes connection with the connected device as described above. For example, the external device 120 is used as the connected device. When the digital camera 100 and the external device 120 are communicably connected, the digital camera 100 can be remotely controlled from the external device 120.

Figure 4:
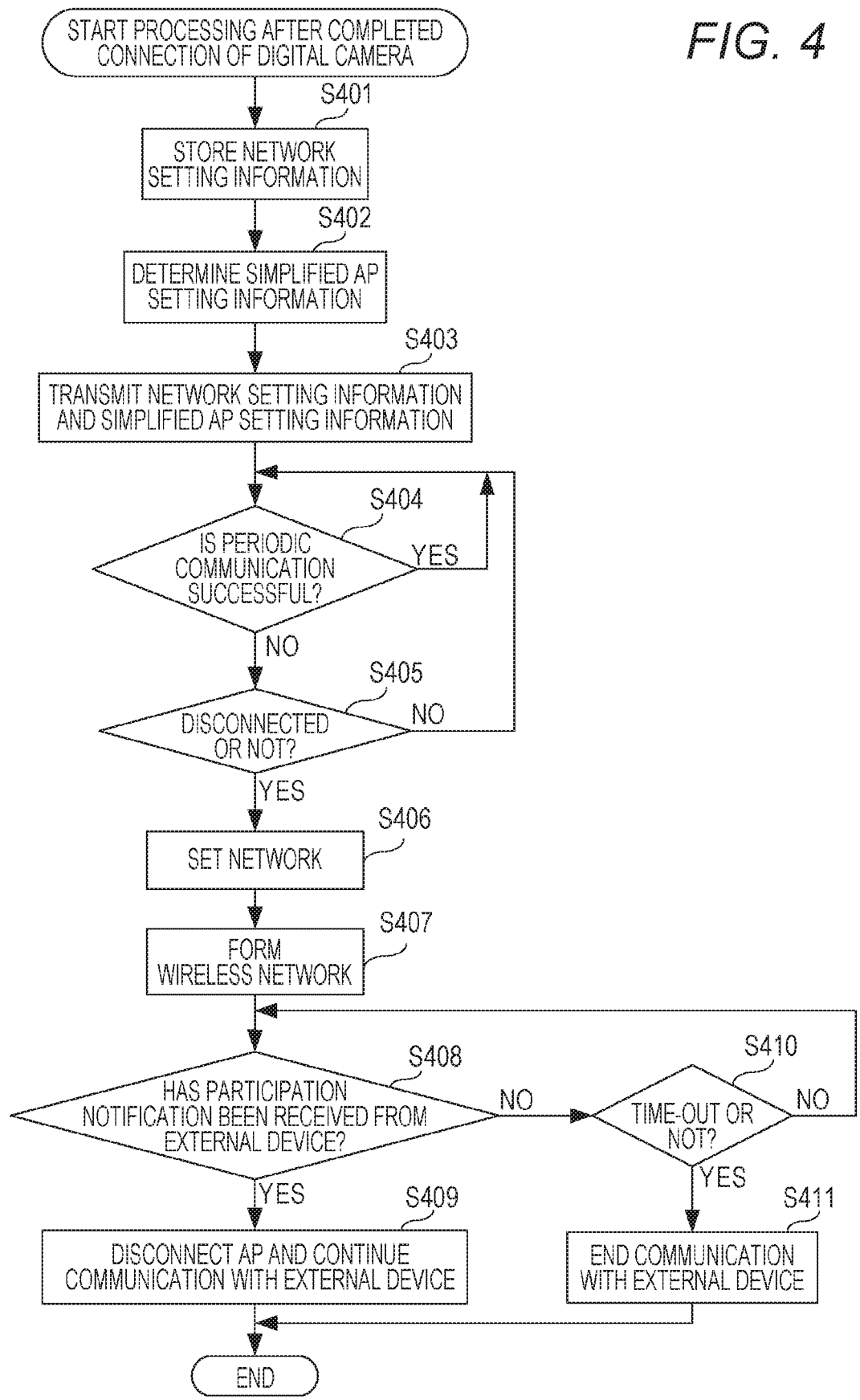
FIG. 4 is a flowchart illustrating an example of processing of the digital camera.

Next, with reference to FIGS. 4 and 6, processing after completed connection of the digital camera 100 will be described. FIG. 4 is a flowchart illustrating an example of processing after completion of connection of the digital camera 100. FIG. 6 is a sequence diagram illustrating an example of communication processing between the digital camera 100 and the external device 120. The processing after completion of the connection of the digital camera 100 is the processing of the digital camera 100 after the digital camera 100 and the external device 120 are connected via an access point 600 and includes the processing when the communication is disconnected. The access point 600 is an example of a relay apparatus.

Prior to the processing of FIG. 4, it is assumed that the connection between the digital camera 100 and the external device 120 via the access point 600 has been completed in the processing of FIGS. 3A, 3B and 3C.

In step S401, the control unit 101 stores network setting information at the time of completion of the connection with the external device 120 via the access point 600, in the work memory 104. For example, when an IP address is acquired by Dynamic Host Configuration Protocol (DHCP), the network setting information includes information such as the IP address and subnet mask of its own device, the IP address of the external device 120, and the like.

In S402, the control unit 101 determines simplified AP setting information that is information for forming a wireless LAN network as a simplified AP, and stores the information in the work memory 104. The simplified AP setting information includes an ESSID, an authentication method, an encryption type, an encryption key, a channel, and the like. The processing of S402 corresponds to S601 in FIG. 6.

The control unit 101 determines simplified AP setting information as follows based on the connected device information set 211 corresponding to the external device 120.

First, a case where the connected device information set 211 corresponding to the external device 120 is the first connected device information set 211a in FIG. 2A will be described. In this case, the "network formation parameter number" of the first connected device information set 211a is "1". Therefore, the control unit 101 acquires the first network formation parameter 231a whose "network formation parameter number" is "1" from the network formation parameter table 230 illustrated in FIG. 2C. Then, the control unit 101 determines simplified AP setting information based on the acquired first network formation parameter 231a. That is, the control unit 101 determines that the ESSID of the simplified AP setting information is "CAMERA-123" and the encryption key of the simplified AP setting information is "12345678". Since the authentication method, encryption type, and channel are self-explanatory, they are not illustrated in FIG. 2C. The authentication method, encryption type, and channel are also stored in the network formation parameter 231 similarly to the ESSID and the like, and the control unit 101 uses these pieces of data.

Next, a case where the connected device information set 211 corresponding to the external device 120 is the second connected device information set 211b in FIG. 2A will be described. In this case, no value is set in the "network formation parameter number" of the second connected device information set 211b. Therefore, the control unit 101 determines the ESSID, encryption key, and channel of the simplified AP setting information to be random values.

The simplified AP setting information is an example of connection information for the external device 120 to directly communicate with the digital camera 100. The ESSID is an example of information for identifying the network formed by the digital camera 100.

In step S403, the control unit 101 transmits network setting information and simplified AP setting information to the external device 120 via the connection unit 111 and the access point 600. The setting information of the network and the simplified AP setting information to be transmitted here are information stored in the work memory 104 by the control unit 101 in S401 and S402. The processing of S403 corresponds to S602 of FIG. 6.

In step S404, the control unit 101 determines whether periodic communication with the external device 120 via the access point 600 has succeeded. When determining that the periodic communication with the external device 120 via the access point 600 is successful, the control unit 101 executes S404 again. When determining that the periodic communication with the external device 120 via the access point 600 has failed, the control unit 101 advances the processing to S405.

Periodic communication between the digital camera 100 and the external device 120 via the access point 600 will now be described. The periodic communication is for determining whether the communication is disconnected. In the present embodiment, periodic communication is performed between the external device 120 and the digital camera 100 by periodically transmitting confirmation data from the external device 120 to the digital camera 100. The confirmation data is data used for confirming whether communication is disconnected. For example, the external device 120 transmits confirmation data once in a predetermined period (for example, 5 seconds). When the confirmation data is received from the external device 120 in a predetermined period, the control unit 101 determines that the periodic communication with the external device 120 has been successfully performed.

When the external device 120 and the digital camera 100 can communicate with each other via the access point 600, the digital camera 100 succeeds in receiving the confirmation data from the external device 120. When communication between the external device 120 and the digital camera 100 via the access point 600 is impossible, the digital camera 100 fails to receive confirmation data from the external device 120. The confirmation data can be transmitted from the digital camera 100 to the external device 120. The transmission interval of the confirmation data can be a time period other than 5 seconds.

In step S405, the control unit 101 determines whether communication between the digital camera 100 and the external device 120 via the access point 600 has been disconnected based on the periodic communication result. When determining that the communication between the digital camera 100 and the external device 120 via the access point 600 is disconnected, the control unit 101 advances the processing to S406. When determining that the communication is not disconnected, the control unit 101 advances the processing to S404. The processing by the control unit 101 of determining that the communication between the digital camera 100 and the external device 120 via the access point 600 is disconnected based on the periodic communication result corresponds to the processing of S605 in FIG. 6.

In S405, when periodic communication with the external device 120 via the access point 600 has failed for a certain period of time, the control unit 101 determines that communication between the digital camera 100 and the external device 120 via the access point 600 has been disconnected. For example, when the confirmation data fails to be received from the external device 120 consecutively three times, the control unit 101 determines that the communication between the digital camera 100 and the external device 120 via the access point 600 has been disconnected. The number of tunes is not limited to three, and can be any number.

In S406, the control unit 101 performs setting of the network necessary for forming the less LAN network, based on the setting information of the network stored in the work memory 104. For example, the control unit 101 validates and activates the DHCP server function of the digital camera 100 as the setting of the network. At that time, the control unit 101 sets the current IP address of the external device 120 to the IP address assigned by the DHCP server of the digital camera 100. As a result, the MCP server of the digital camera 100 can assign, to the external device 120, the same IP address as the IP address of the external device 120 before the disconnection of communication with the external device 120 via the access point 600 is detected.

In step S407, the control unit 101 forms a wireless LAN network using the digital camera 100 as a simplified AP based on the simplified AP setting information stored in the work memory 104. More specifically, the control unit 101 generates a packet including at least a part of the simplified AP setting information, and starts transmission by broadcast via the connection unit 111. The packet generated by the control unit 101 includes the ESSID of the simplified AP setting information. The processing of S407 corresponds to the processing of forming the simplified AP in S607 in FIG. 6. The wireless LAN network is an example of a communication network.

In step S408, the control unit 101 determines whether the participation notification with respect to the wireless LAN network formed in step S407 has been received from the external device 120 via the connection unit 111. When determining that the participation notification from the external device 120 has been received, the control unit 101 advances the processing to S409. When determining that the notification of participation from the external device 120 has not been received, the control unit 101 advances the processing to S410. The processing of S408 corresponds to the processing for receiving a participation request to the simplified AP of S610 in FIG. 6.

The control unit 101 can determine whether a notification of participation from the external device 120 has been received based on the "Auth Request" of the wireless LAN received via the connection unit 111. In addition, the control unit 101 can compare the first MAC address and the second MAC address to determine whether a notification of participation from the external device 120 has been received. The first MAC address is the MAC address of the external device 120 when the control unit 101 is communicably connected with the external device 120 via the access point 600. The second MAC address is the MAC address at the time of receiving "Auth Request". By doing this, the control unit 101 can check whether the communication partner is a partner with which the control unit 101 previously communicated.

In S409, the control unit 101 disconnects itself from the wireless network thrilled by the access point 600. Then, using the connection unit 111, the control unit 101 directly communicates with the external device 120 via the connection unit 111 in a network formed in S407. Due to this, the communication between the digital camera 100 and the external device 120 continues. The processing of S409 corresponds to S611 of FIG. 6.

In S410, the control unit 101 determines whether time-out has occurred without the notification of participation from the external device 120 in the wireless LAN network formed in S407 for a certain period of time. When determining that time-out has occurred, the control unit 101 advances the processing to S411. When determining that time-out has not occurred, the control unit 101 advances the processing to S408. The time-out period of the digital camera 100 used in S410 is shorter than the time-out period of the external device 120 used in S505 of FIG. 5. The control unit 121 acquires, for example, the time-out period of the digital camera 100 from the nonvolatile memory 103.

In step S411, the control unit 101 performs disconnection processing and terminates communication with the external device 120. At this time, the control unit 101 can display a message or the like indicating that communication has been disconnected on the display unit 106.

Next, with reference to FIGS. 5 and 6, processing after completed connection of the external device 120 will be described. FIG. 5 is a flowchart illustrating an example of the processing after completed connection of the external device 120. The processing after completed connection of the external device 120 is a processing of the external device 120 after the digital camera 100 and the external device 120 are connected via the access point 600, and includes processing when the communication is disconnected.

In S501, the control unit 121 receives the simplified AP setting information and network setting information via the connection unit 131 from the digital camera 100 via the access point 600, and stores the information in the work memory 124. The processing of S501 corresponds to S603 of FIG. 6.

In S502, the control unit 121 determines whether periodic communication with the digital camera 100 via the access point 600 has succeeded. When determining that the periodic communication with the digital camera 100 via the access point 600 is successful, the control unit 121 executes S502 again. When determining that the periodic communication with the digital camera 100 via the access point 600 has failed, the control unit 121 advances the processing to S503. As described above, the external device 120 periodically transmits the confirmation data to the digital camera 100 so that periodic communication is performed between the external device 120 and the digital camera 100. When receiving an ACK which is a response to the confirmation data from the digital camera 100 after transmitting the confirmation data, the control unit 121 determines that the periodic communication via the access point 600 has succeeded.

In S503, the control unit 121 determines whether communication with the digital camera 100 via the access point 600 has been disconnected based on the result of periodic communication. The control unit 121 advances the processing to S504 when determining that the communication with the digital camera 100 via the access point 600 has been disconnected, and advances the process to S502 when determining that the communication has not been disconnected. In S503, the control unit 121 determines that the communication with the digital camera 100 has been disconnected when the periodic communication with the digital camera 100 via the access point 600 has failed for a certain period of time. The processing of S604 in FIG. 6 corresponds to processing in which the control unit 121 determines that the communication with the digital camera 100 via the access point 600 has been disconnected based on the periodic communication result.

In S504, the control unit 121 searches nearby APs by controlling the connection unit 131. To be more specific, the control unit 121 searches nearby APs by receiving the packets transmitted by the APs present in the surroundings via the connection unit 131. This search processing corresponds to the processing of scanning for the simplified AP of S606 in FIG. 6. The control unit 121 refers to the simplified AP setting information stored in the work memory 124 in S501 when searching nearby APs and determines whether the ESSID included in the simplified AP setting information exists in the searched APs. When determining that the ESSID included in the simplified AP setting information exists in the searched APs, the control unit 121 advances the processing to S506. When determining that the ESSID included in the simplified AP setting information does not exist in the searched APs, the control unit 121 advances the processing to S505. The processing of determining that the ESSID included in the simplified AP setting information exists in the searched APs corresponds to S608 in FIG. 6.

In S505, the control unit 121 determines whether the ESSID included in the simplified AP setting information has not been found for a certain period of time in the search of the APs and time-out has occurred. The control unit 121 advances the processing to S507 when determining that the time-out has occurred, and advances the processing to S504 when determining that the time-out has not occurred. The time-out period of the external device 120 used in S505 is longer than the time-out period of the digital camera 100 used in S410 of FIG. 4. The control unit 121 acquires, for example, the time-out period of the external device 120 from the nonvolatile memory 123.

In S506, based on the simplified AP setting information stored in the work memory 124, the control unit 121 transmits a request to participate in the wireless LAN network in which the digital camera 100 has become a simplified AP to the digital camera 100 via the connection unit 131. Then, based on a response from the digital camera 100 or the like, the control unit 121 determines whether the communication connection with the digital camera 100 is successful. When determining that the communication connection with the digital camera 100 is successful, the control unit 121 advances the processing to S508. When determining that the communication connection with the digital camera 100 has failed, the control unit 121 advances the processing to S507. The processing of S506 corresponds to S609 of FIG. 6.

In S507, the control unit 121 performs disconnection processing and terminates communication with the digital camera 100. At this time, the control unit 121 can display a message or the like indicating that communication has been disconnected on the display unit 126.

In S508, the control unit 121 performs direct communication with the digital camera 100 via the connection unit 131 in a network in which the digital camera 100 has become a simplified AP. Due to this, the communication between the digital camera 100 and the external device 120 continues. The processing of S508 corresponds to S611 of FIG. 6.

The processing of S504, S506, and S508 is an example of control processing for control of direct communication with the digital camera 100 based on the simplified AP setting information received from the digital camera 100.

As described above, the digital camera 100 transmits the simplified AP setting information to the external device 120 via the access point 600. When detecting disconnection of communication with the external device 120 via the access point 600, the digital camera 100 performs control to directly communicate with the external device 120.

In addition, the external device 120 receives the simplified AP setting information from the digital camera 100 via the access point 600. When detecting disconnection of communication with the digital camera 100 via the access point 600, the external device 120 performs control to directly communicate with the digital camera 100.

Therefore, even if the digital camera 100 and the access point 600 cannot communicate with each other or the external device 120 and the access point 600 cannot communicate with each other, direct communication is performed between the digital camera 100 and the external device 120. Accordingly, even if communication is disconnected, communication can be continued. From the viewpoint of the user, the communication is continued without the user being aware of the communication via the access point 600 having been disconnected, thus resulting in enhancing the user's convenience.

For example, it is assumed that the digital camera 100 and the external device 120 are communicating via the access point 600 on a certain floor of a building. Thereafter, when the user moves the digital camera 100 and the external device 120 to another floor or the like, the distance to the access point 600 increases so that the digital camera 100 and the external device 120 sometimes cannot communicate with the access point 600. However, the digital camera 100 and the external device 120 directly communicate with each other in the communication system of this embodiment. Therefore, even if disconnected from an access point, communication can be continued.

When the digital camera 100 detects disconnection of communication with the external device 120 via the access point 600, the digital camera 100 uses the connection unit 111 for direct communication with the external device 120. The connection unit 111 is a communication interface used for communication with the external device 120 via the access point 600. Therefore, the digital camera 100 does not need to change the communication interface depending on whether communication is performed via the access point 600. Accordingly, the digital camera 100 does not need to have an extra communication interface. In addition, when detecting disconnection of communication with the external device 120 via the access point 600, the digital camera 100 forms a wireless LAN network in which the digital camera 100 is an AP. Therefore, the time during which the communication between the digital camera 100 and the external device 120 is disconnected can be shortened.

Modification Example

In the above embodiment, as described with reference to FIG. 4, when disconnection of communication with the external device 120 via the access point 600 is detected, the control unit 101 forms a wireless LAN network using the digital camera 100 as a simplified AP. The control unit 101 can form a wireless LAN network with the digital camera 100 as a simplified AP, before detecting disconnection of communication with the external device 120 via the access point 600. For example, the control unit 101 can form a wireless LAN network using the digital camera 100 as a simplified AP when the power of the digital camera 100 is turned on. When starting communication with the external device 120 via the access point 600, the control unit 101 can form a wireless LAN network with the digital camera 100 as a simplified AP.

When the state of communication with the access point 600 satisfies the predetermined condition, the control unit 101 can form a wireless LAN network using the digital camera 100 as a simplified AP. The case where the predetermined condition is satisfied is, for example, a case where the radio wave intensity received from the access point 600 becomes less than or equal to a predetermined intensity. For example, information representing a predetermined condition or information on a predetermined intensity is stored in the nonvolatile memory 103. The control unit 101 acquires the information indicating predetermined condition or the information on the predetermined intensity from the nonvolatile memory 103.

As a result, when the external device 120 detects disconnection of communication with the digital camera 100 before the digital camera 100 detects disconnection of communication with the external device 120 via the access point 600, the external device 120 can perform the following processing. That is, the external device 120 performs control to start direct communication with the digital camera 100 before the digital camera 100 detects disconnection of communication with the external device 120 via the access point 600. Accordingly, the time during which the communication between the digital camera 100 and the external device 120 is disconnected can be shortened.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, the above-described embodiments are merely examples and are not seen to be limiting. That is, the present disclosure can be implemented in various forms without departing from the technical idea or the main features thereof.

For example, as a hardware configuration of the digital camera 100 or the external device 120, there can be a plurality of control units, and the plurality of control units can execute processing based on a program stored in a nonvolatile memory or the like of each device.

According to the above-described embodiment, communication can be continued even when a communication interface is disconnected.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-220067, filed Nov. 15, 2017, which is hereby incorporated by reference herein in its entirety.

What is claimed is:

1. A communication apparatus that communicates with an external apparatus, the communication apparatus comprising:
a transmitter configured to transmit, to the external apparatus via a first relay apparatus, connection information that the external apparatus uses to directly communicate with the communication apparatus before disconnection of communication with the external apparatus via the first relay apparatus; and
a controller configured to control direct communication with the external apparatus based on the connection information transmitted beforehand, when the disconnection of communication with the external apparatus via the first relay apparatus is detected.

2. The communication apparatus according to claim 1, further comprising a communication interface configured to be used for communication with the external apparatus via the first relay apparatus, wherein
the controller controls direct communication with the external apparatus by using the communication interface when the disconnection of communication with the external apparatus via the first relay apparatus is detected.

3. The communication apparatus according to claim 1, wherein the controller has a communication network forming function to form a communication network using the communication apparatus as a second relay apparatus, wherein
the controller controls direct communication with the external apparatus by using the communication network formed when the disconnection of communication with the external apparatus via the first relay apparatus is detected.

4. The communication apparatus according to claim 3, wherein
the controller forms the communication network when the disconnection of communication with the external apparatus via the first relay apparatus is detected.

5. The communication apparatus according to claim 3, wherein
the controller forms the communication network when a state of communication with the first relay apparatus satisfies a predetermined condition.

6. The communication apparatus according to claim 3, wherein
the connection information includes information for identifying the formed communication network.

7. The communication apparatus according to claim 1, wherein
the controller controls direct communication with the external apparatus when the disconnection of communication with the external apparatus via the first relay apparatus is detected, and controls assigning to the external apparatus an address of the external apparatus used before disconnection of communication with the communication apparatus via the first relay apparatus is detected.

8. The communication apparatus according to claim 1, wherein the controller is configured to detect the disconnection of communication with the external apparatus via the first relay apparatus, wherein
the controller controls direct communication with the external apparatus according to the disconnection of communication with the external apparatus via the first relay apparatus.

9. The communication apparatus according to claim 8, wherein the controller detects the disconnection of communication with the external apparatus based on a result of communication periodically performed with the external apparatus.

10. The communication apparatus according to claim 1, wherein the communication apparatus is an image capturing apparatus.

11. A method for communication executed by a communication apparatus that communicates with an external apparatus, the method comprising:

transmitting, to the external apparatus via a relay apparatus, connection information that the external apparatus uses to directly communicate with the communication apparatus before disconnection of communication with the external apparatus via the relay apparatus; and controlling direct communication with the external apparatus based on the connection information transmitted beforehand, when disconnection of communication with the external apparatus via the relay apparatus is detected.

12. A non-transitory computer readable storage medium storing a program that causes a computer to execute a method to control a communication apparatus that communicates with an external apparatus, the method comprising:

transmitting, to the external apparatus via a first relay apparatus, connection information that the external apparatus uses to directly communicate with the communication apparatus before disconnection of communication with the external apparatus via the relay apparatus; and controlling direct communication with the external apparatus based on the connection information transmitted beforehand, when disconnection of communication with the external apparatus via the first relay apparatus is detected.

* * * * *